United States Patent Office 3,058,896
Patented Oct. 16, 1962

3,058,896
CATALYTIC HYDROREFINING OF HYDRO-CARBON OILS
Paul G. Nahin, Brea, Calif., assignor to Union Oil Company of California, Los Angeles, Calif., a corporation of California
No Drawing. Filed Aug. 12, 1957, Ser. No. 677,752
13 Claims. (Cl. 204—154)

This invention relates to new methods for the catalytic hydrorefining of mineral oils, and to new catalysts for treatment thereof. Briefly, the invention resides in subjecting mineral oils to conditions effective for the selective hydrocracking or organic sulfur, nitrogen or oxygen compounds, in the presence of hydrogen and an adsorbent catalyst, wherein the active surface areas of said catalysts are modified by the distribution thereon of radioactive materials. Specifically, the radioactive materials employed are those which emit beta radiation (electrons, positrons, or conversion electrons) with or without accompanying gamma radiation (electromagnetic photon). Alpha emitters are excluded, and in the preferred form, the radiation is predominantly or wholly beta radiation. The base catalyst consists of an adsorbent carrier upon which is deposited an active hydrogenation component, as for example a heavy metal oxide or sulfide.

The term "hydrorefining" as used herein means the selective hydrocracking of hydrocarbon feedstocks contaminated with various organic impurities such as sulfur compounds, nitrogen compounds and oxygen compounds, with resultant chemical consumption of hydrogen. The catalysts used, and the reaction conditions are chosen so as to effect hydrogenation and decomposition of the sulfur, nitrogen and oxygen compounds with a minimum of hydrocracking of the hydrocarbon components. Such hydrorefining processes have become widely used for refining selected feedstocks, e.g. gasolines, kerosene, light gas oils, heavy gas oils, solvent naphthas, and the like. In these known processes, the feed is normally admixed with e.g. 300–5000 s.c.f of hydrogen per barrel of feed, preheated to a temperature of about 650–875° F., and then passed through a bed of the desired catalyst. Pressures of about 300–5000 p.s.i.g. are normally employed, along with feed rates amounting to about 0.2 to 15 volumes of liquid feed per volume of catalyst per hour.

The foregoing conventional hydrorefining processes display several disadvantageous features. They are not completely selective, and hence will always effect some decomposition of hydrocarbons, and there is a gradual accumulation of tars, coke and other deposits upon the catalyst which eventually result in deactivation thereof. The high temperatures and pressures employed are disadvantageous from the standpoint of safety, ease of handling, and expense of construction and maintenance of processing equipment. Moreover, the treating capacity of any given unit is limited by the intrinsic activity of the catalyst employed.

It is an object of this invention to reduce the temperature levels required for effective hydrorefining. Another object is to reduce the pressures and hydrogen recycle rates. Still another object is to improve the selectivity of such processes, i.e. to further promote the decomposition of non-hydrocarbons as compared to hydrocarbons. A further object is to reduce the coke laydown upon the catalyst, and thus extend its useful life. Still another object is to increase the intrinsic activity of conventional hydrorefining catalysts. Another object is to provide novel hydrorefining catalysts. Other objects will be apparent from the more detailed decription which follows.

Feedstocks which may be treated herein include in general any mineral oil stock boiling between about 100° and 1000° F., and containing between about 0.001% and 10% by weight of organically combined sulfur, nitrogen and/or oxygen. Specific examples of suitable stocks include crude oils, reduced crude oils, deasphalted reduced crude oils, light gas oils, heavy gas oils, kerosene, solvent naphthas, fuel oils, diesel fuels, jet fuels, heavy naphthas, light naphthas, cycle oils from cracking operations, cracked gasolines, etc. These stocks may be derived from petroleum, shale, tar sands, or any other similar natural deposits.

The catalysts of this invention are preferably employed in the form of granules, lumps, pellets, or the like, ranging in size from about ⅛ inch to about 1 inch in average diameter. These catalyst pellets are disposed as a stationary bed within a suitable reactor, as for example a cylindrical steel column. The feedstock is preheated to the desired temperature, admixed with hydrogen and passed through the catalyst bed at the desired temperature and pressure. The products are recovered in the conventional manner, with the single additional precaution that the product stream must be suitably monitored by means of a radiation detector to insure that no radioactive catalyst fines are being carried off. One feature of the invention comprises the addition of radioactive material to the catalyst in such form as to remain permanently affixed thereto.

The base catalysts employed herein may consist of any conventional hydrorefining catalyst, which in all cases will include an active hydrogenating component. In general, the oxides and sulfides of transitional metals are useful hydrogenating components, and especially the group VIB and group VIII metal oxides and sulfides. In particular, the combination of one or more group VIB metal oxides or sulfides with one or more of the group VIII metal oxides or sulfides is preferred. For example, combinations of nickel-tungsten oxides and/or sulfides, cobalt-molybdenum oxides and/or sulfides, are specifically contemplated. However, iron oxide, iron sulfide, cobalt oxide, cobalt sulfide, nickel oxide, nickel sulfide, chromium oxide, chromium sulfide, molybdenum oxide, molybdenum sulfide, tungsten oxide or tungsten sulfide may be used alone to less advantage.

In all the foregoing cases, the hydrogenating component is preferably distended and supported on a relatively inert carrier. Generally, minor proportions of the hydrogenating component are used, ranging between about 1% and 25% by weight. Suitable carriers include for example activated alumina, activated alumina-silica, zirconia, titania, activated clays such as bauxite, bentonite and montmorillonite, and the like. Preferably the hydrogenating component is added to the carrier by impregnation from aqueous solution, followed by drying and calcining to activate the composition. Suitable calcining temperatures range between about 500° and 1200° C.

The preferred base catalyst for use herein comprises the composition usually known as cobalt-molybdate, which actually may be a mixture of cobalt and molybdenum oxides. This mixture is preferably distended upon activated alumina, or still more preferably, activated alumina containing 1% to 15% of coprecipitated silica gel. The atomic ratio of cobalt to molybdenum may be between 0.4 and 5.0, and the total proportion of hydrogenating component is preferably between about 7% and 22% by weight, comprising about 1%–7% of CoO, and 6%–15% of $MoO_3$. Catalysts of this type may be prepared by coprecipitation of both components on the carrier as described in U.S. Patent No. 2,369,432, and No. 2,325,033, or by co-impregnation of both components on the carrier as described in U.S. Patent No. 2,486,361. Preferably however they are prepared by separate alternate impregnations as described in U.S. Patent No. 2,687,381.

To prepare the finished radioactive catalysts of this invention, any suitable beta-emitting radioactive isotope is added thereto in such manner as to be distributed evenly over the active surface areas thereof. Suitable methods include for example impregnation with an aqueous solution of a soluble compound of the radioactive isotope. Such impregnations may be carried out either before or after addition of the hydrogenating component. In order to minimize the handling of radioactive material, it is preferable to add the radioactive component after all hydrogenating components have been added and the catalyst has been shaped into the desired pellet form. The addition of the radioactive component is then followed by a final drying and calcining step.

Those skilled in the art will readily understand that suitable precautionary measures must be observed throughout the handling of the radioactive materials. The radioactive material added must be one which upon calcining will be reduced or oxidized to a stable, non-volatile element or compound which will remain firmly affixed to the catalyst. Suitable chemical states for the final radioactive component include for example the free metals, oxides, sulfides, halides, sulfates, and the like.

In addition to impregnation methods, the radioactive component may be added by other conventional procedures, as for example coprecipitation with one or more of the other catalyst components, co-impregnation with one or more of the other catalyst components, and the like. In general, any suitable method for uniformly distending the radioactive element upon the active surface area of the catalyst may be employed. In one modification, the desired radioactivity may be produced and maintained on the catalyst by circulating it through a nuclear reactor where it is subjected to neutron bombardment in order to induce radioactivity in one or more of the components thereof. In using this modification, due precautions must be taken to remove from the catalyst all elements which by neutron bombardment might be converted to radioactive isotopes volatile under the conditions of hydrorefining. This means for example that all nitrogen, phosphorus, chlorine, and sulfur compounds must first be removed from the catalyst, as by oxidation, in order to prevent the formation of radioactive, volatilizable isotopes such as $C^{14}$, $P^{32}$, $S^{35}$, $Cl^{36}$, etc.

As noted above, it is preferred that the radioactive addend comprise one or more isotopes which emit wholly or predominantly beta radiation. The use of beta emitters is found to improve the selectivity of the conversion, as compared to the use of alpha or gamma emitters. Beta radiation spectra of maximum energy levels between about 0.01 and 3.9 mev. may be employed, preferably between about 0.02 and 2.3 mev. The maximum range in aluminum of the 0.01–1.7 mev. electrons is 0.7–800 mg./cm.$^2$. These radiations hence have relatively low powers of penetration through solids, but yet possess sufficient energy to give fairly high specific ionization values. On the other hand, gamma radiations of the same energy levels are much more penetrating and give lower specific ionization values. It will hence be apparent that where a gamma emitter is employed, the concentration of induced ionization will be substantially uniform throughout the catalyst zone. This is not the case however where beta emitters are employed.

Catalyst pellets of the size above described contain by far the greater percentage of their active surface area in the interior of each pellet. The exterior surface area of such pellets comprises considerably less than 0.1% of the total available active surface area. Hence, when a beta emitter is intimately distributed over the entire active surface area, at least about 99.9% thereof will ordinarily be enclosed and shielded within the outer layers of each catalyst particle. Since beta rays of the above maximum energies will, on a statistical basis, penetrate only a relatively small thickness of catalyst, it is obvious that by far the greater proportion of the active particle radiation will be confined within the interior of each catalyst pellet, and its energy will be absorbed predominantly on the active surface areas where reaction is desired. A relatively lesser amount of the available energy will be absorbed by molecules not in the adsorbed phase.

This, it will be observed, is precisely what is desired in order to improve selectivity. The sulfur-, nitrogen- and oxygen-containing molecules are those which are selectively adsorbed in preference to hydrocarbons, and hence where the effects of radiation can be concentrated on the adsorbed phase, as compared to the unadsorbed phase (hydrocarbon-rich), an improvement in selectivity will result.

From the foregoing, it is clear that the concentration of beta radiation is higher within the core of the catalyst pellets than at the exterior surfaces. As a corollary, the proportion of the total radiation which can escape through the exterior surface of each catalyst pellet is small compared to that which is retained and expended within each catalyst pellet. As a result, the gases or liquid filling the large void spaces, or interstices, between the catalyst pellets will be relatively less subject to the ionizing effects of radiation than will that portion of the feed which happens to be diffused within the micropores of each catalyst pellet. This is as desired because the concentration of organic sulfur, nitrogen, and oxygen compounds in the interstitial fluid must necessarily be less than the concentration of those components in the adsorbed phase within the micropores. Summing up, it will be seen that the adsorbent nature of the catalyst, and its form as a macro-pellet, cooperate to produce a concentration of the most readily adsorbable compounds in the same general zone where the opaque nature of the catalyst acts to concentrate the relative intensity of beta radiation, and where selective reaction is desired.

The foregoing effects are not obtained however where a gamma emitter is employed. The size of catalyst pellets employed herein is insufficient to effect any appreciable shielding of gamma rays. Hence, if a gamma emitter were impregnated on the catalyst, there would be a substantially uniform gamma ray concentration throughout the reaction zone. This general radiation would hence not necessarily affect the adsorbed phase more than the unadsorbed phase. The result would be a lesser degree of selectivity. It is not intended however, to exclude the use of mixed beta and gamma emitters, so long as a substantial portion of the total radiation energy is in the form of beta particles. It is preferred that between about 20% and 100% of the total radiation energy be in the form of beta rays.

Alpha ray emitters are excluded herein because alpha radiation is relatively less efficient for promoting a selective reaction. The range of alpha particles in solids is very low; hence a larger proportion of the ionizing radiations are dissipated in the solid substrate. Moreover, the effects of primary collisions of alpha particles with feed molecules are undesirable because the energy released is so tremendous that the target molecule is likely to be completely disrupted, resulting in the production of coke, methane, ethane and other light gases. The desired objective is to obtain cleavage only of C—S, C—N or C—O bonds, with hydrogenation of the fragments.

Alpha ray emitters also present increased physiological hazards as compared to beta emitters. In the case of pure beta emitters, it will be appreciated that the usual type of steel reaction vessel will constitute a sufficient shielding for those working in the area. For mixed beta and gamma emitters, additional lead or concrete shielding must be used.

The amount of radioactive material added may range anywhere from the lowest quantity which is found to give any discernible effect up to a quantity sufficient to provide about 100,000 curies per cubic foot of catalyst bed. Preferably, radiation levels within the range of about 500 to 50,000 curies per cubic foot are employed. The severity of the conventional reaction conditions may be decreased in proportion to the amount of added radioactivity. By suitably adjusting the level of radioactivity, temperature levels between 0° and 850° F. may be employed. Conversely, if it is desired to increase the throughput instead of reducing temperature, high throughput levels ranging up to about 50 volumes of liquid feed per volume of catalyst per hour may be obtained. Concomitantly with these increases in throughput and/or decreases in temperature, the pressure and hydrogen rates may be reduced as a result of the activating energy supplied by the radioactive addend. At any given combination of reaction temperature and throughput rate, pressures may be reduced to the range of about 0 to 500 p.s.i.g., while hydrogen rates may be reduced to only slightly more than stoichiometric, e.g. 200–1000 s.c.f. per barrel of feed.

At the preferred levels of radioactivity, it is found that optimum temperature levels for the hydrorefining operation lie within the range of about 350–650° F., optimum pressures about 100–3000 p.s.i.g., and hydrogen rates between about 300 and 3000 s.c.f. per barrel of feed. Conversely, while maintaining conventional temperatures, pressures and hydrogen rates, the feed rate may be increased two to fivefold over that which would normally be employed. It will be found that the reaction conditions herein prescribed will typically result in the decomposition of 95–100% of the sulfur compounds present, 85–99% of the nitrogen compounds, and substantially all of the oxygen compounds.

Any one or more of the many available radioactive isotopes may be employed herein. These materials may be derived from the fuel elements, or fission products of nuclear reactors, neutron pile-irradiated isotopes, isotopes produced by bombardment in particle accelerators and the like. Normally, the pure isotope will not be employed, as they are unnecessarily expensive. Isotopic concentrates of specific activity anywhere between about 1 and 60,000 curies per gram may be employed. Examples of suitable radiation sources which may be employed include the following, which is not however intended as a complete listing:

| Isotope | Half-life | Radiation energy (maximum) | | Suitable compounds for impregnation |
|---|---|---|---|---|
| | | $\beta$, mev. | $\gamma$, mev. | |
| $Ca^{45}$ | 152 d | 0.254 | None | $CaCl_2$, $CaSO_4$ |
| $Ce^{144}$ | 282 d | 0.35 | 0.03–0.134 | $Ce_2(SO_4)_3$, $Ce(NO_3)_3$ |
| ($Pr^{144}$) | 17.5 m | 3.0 | 2.2–0.7)* | |
| $Cs^{137}$ | 33 y | 0.51–1.17 | 0.66 | $CsCl$, $Cs_2SO_4$. |
| $Ni^{63}$ | 85 y | 0.067 | None | $NiCl_2$, $NiSO_4$, $Ni(NO_3)_2$. |
| $Pm^{147}$ | 2.6 y | 0.223 | None | $PmCl_3$, $Pm(NO_3)_3$. |
| $Ru^{106}$ | 1.0 y | 0.0392 | None | $RuCl_4$. |
| ($Rh^{106}$) | 30 s | 3.55–2.44 | 0.51–2.4)* | |
| $Sr^{90}$ | 25 y | 0.61 | None | $SrCl_2$, $Sr(NO_3)_2$ |
| ($Y^{90}$) | 2.54 d | 2.18 | ")* | |
| $Sr^{89}$ | 53 d | 1.46 | None | $SrCl_2$, $Sr(NO_3)_2$ |
| $Co^{60}$ | 5.25 y | 0.31 | 1.17–1.33 | $CoCl_2$, $Co(NO_3)_2$. |
| $Sc^{46}$ | 85 d | 0.36–1.2 | 0.89–1.12 | $Sc_2(SO_4)_3$, $Sc(NO_3)_3$. |
| $Ag^{110}$ | 270 d | 0.09–2.12 | 0.65–0.94 | $AgNO_3$, $Ag_2SO_4$. |
| | | 0.57–2.86 | 0.90–1.54 | |
| $S^{35}$ | 87 d | 0.167 | None | $CaSO_4$, $Na_2SO_4$. |
| $Tl^{204}$ | 3 y | 0.77 | None | $H_5TlO_6.4H_2O$. |
| $W^{185}$ | 73 d | 0.43 | None | $(NH_4)_2WO_4$, $WS_3$. |
| $Y^{91}$ | 59.5 d | 1.537–0.33 | 1.22 | $YCl_3$, $Y(NO_3)_3$. |

* Daughter element of preceding isotope.

By impregnating with any of the foregoing compounds, then drying and calcining at e.g. 500–1000° C., a substantially stable and non-volatile residue of radioactive element in the form of oxides, sulfates, sulfides, or halides will remain on the catalyst.

It is preferable to use radioactive isotopes with a half-life of approximately the expected life of the catalyst. This obviates recovery problems and simplifies disposal of the spent catalyst. However, in the case of long-lived isotopes, it is contemplated that suitable recovery techniques may be employed for recovering the radioactive component for reuse. In the case of short-lived isotopes, it is contemplated that the spent catalyst may be reactivated by reimpregnation with fresh radioactive material. In any case, when the hydrogenating activity of the catalyst has declined to an undesirable degree, such activity may be regenerated by conventional oxidation techniques without disturbing the radioactive component. In carrying out oxidative regeneration, due care must be exercised to monitor the spent flue gases for radioactive dust.

To illustrate the effect of the radioactive catalysts of this invention, the following examples are cited, which should not however be construed as limiting in scope.

Example I

Typical catalysts suitable for use herein are illustrated in the following table. In all cases, the preferred method of manufacture consists in: (1) precipitating from aqueous solution the hydrous oxide gel of the carrier (except in the case of activated clays), (2) drying the carrier, (3) compressing the carrier into ¼-inch pellets, (4) impregnating with an aqueous solution, or solutions, of soluble salts (e.g. nitrates, molybdates, tungstates, chromates, vanadates, etc.) of the desired hydrogenating component, (5) drying and calcining at 600° C. for 5 hours, (6) impregnating with an aqueous solution of a soluble salt (e.g. nitrate or sulfate) of the radioactive component, and (7) drying and calcining at 600° C. for about 6–8 hours.

| Catalyst | Carrier, weight percent | Hydrogenating component, weight percent | Radioactive component | | |
|---|---|---|---|---|---|
| | | | Isotope | Gms./C.F. | Activity of finished catalyst curies/C.F. |
| 1 | $Al_2O_3$, 81<br>$SiO_2$, 5 | $MoO_3$, 9<br>CoO, 3 | $Pm^{147}$ | 1.6 | 1,500 |
| 2 | $Al_2O_3$, 78<br>$SiO_2$, 4 | $WS_3$, 12<br>NiS, 3.5 | $Ni^{63}$ | 22.5 | ² 1,500 |
| 3 | $Al_2O_3$, 78<br>$SiO_2$, 4 | $WS_3$, 12<br>NiS, 3.5 | $W^{185}$ | 0.515 | ² 5,000 |
| 4 | $Al_2O_3$, 86 | $MoO_3$, 9<br>CoO, 3.5 | $Sr^{90}$ | 18.9 | 3,000 |
| 5 | $Al_2O_3$, 86 | $MoO_2$, 9<br>CoO, 3.5 | $Ca^{45}$ | 0.035 | 600 |
| 6 | Acid-activated bentonite, 81 | $MoS_3$, 18 | $S^{35}$ | 1.33 | ¹ ² 50,000 |
| 7 | $ZrO_2$, 87 | $V_2O_5$, 11 | $Y^{91}$ | 0.82 | 20,000 |
| 8 | $Al_2O_3$, 90 | FeO, 9 | $W^{185}$ | 1.03 | 10,000 |
| 9 | $Al_2O_3$, 95 | NiS, 5 | $Ni^{63}$ | 11.7 | ² 800 |
| 10 | $Al_2O_3$, 86 | $MoO$, 9<br>CoO, 4 | $Cs^{137}$ | 7.6 | 600 |
| 11 | $Al_2O_3$, 86 | $MoO$, 9<br>CoO, 4 | $W^{185}$ | 5.15 | 50,000 |
| 12 | $SiO_2$, 86 | $MoO$, 9<br>CoO, 4 | $Ca^{45}$ | 0.58 | 10,000 |
| 13 | $SiO_2$, 89 | $Cr_2S_3$, CrS, 10 | $Ca^{45}$ | 1.16 | ² 20,000 |
| 14 | $Al_2O_3$, 86 | $MoO$, 9<br>CoO, 4 | $W^{185}$ | 2.57 | 25,000 |
| 15 | $Al_2O_3$, 86 | $MoO$, 9<br>CoO, 4 | None | | |

¹ $S^{35}$ added in the form of $CaS^{35}O_4$.
² Catalysts are sulfided with $H_2S$ at 500° F. following final calcining.

*Example II*

Catalyst No. 15 (Example I) is employed for the hydrorefining of a Santa Maria Valley (California) gas oil having a boiling range of about 450–800° F., and containing 3.5% sulfur and 0.3% nitrogen by weight. The conditions of hydrorefining are:

Temperature _____ 780° F.
Pressure _____ 1500 p.s.i.g.
LHSV _____ 1.0.
Hydrogen rate _____ 3000 S.c.f./bbl.

The product gas oil has a boiling range of about 350–700° F., and contains 0.05% sulfur and 0.04% nitrogen.

When this same feed is treated under identical process conditions, using catalyst No. 5, having a moderately low radioactivity, the sulfur content of the product is less than 0.03% and the nitrogen content less than 0.01%. This example shows that catalysts of mild radioactivity may be used to obtain improved results under conventional hydrorefining conditions.

*Example III*

Catalyst No. 11 (Example I) is employed for hydrorefining the gas oil feedstock of Example II under the following conditions:

Temperature _____ 450° F.
Pressure _____ 600 p.s.i.g.
LHSV _____ 1.0.
Hydrogen rate _____ 2000 s.c.f./bbl.

The product gas oil is found to have a boiling range of about 370–780° F., sulfur content of less than 0.02%, and a nitrogen content of less than 0.01%. This example shows that the highly radioactive catalysts may be used under extremely mild conditions to give improved desulfurization and denitrogenation with less hydrocarbon cracking, as compared to a nonradioactive catalyst used under more severe conditions of temperature and pressure (cf. Example II).

When the foregoing run is repeated using nonradioactive catalyst No. 15, only about 20% of the feed sulfur is removed, and substantially none of the nitrogen.

It is contemplated that any of the radioactive addends previously described may be substituted in the foregoing examples with commensurately improved results. Likewise, by varying the concentration of radioactivity within the disclosed ranges, commensurate improvements in selectively and activity are obtained. It is not intended to limit the invention except in accordance with the terms of the following claims.

I claim:

1. A process for hydrorefining a mineral oil hydrocarbon feedstock containing an indigenous organic impurity from the class consisting of sulfur compounds, nitrogen compounds, and oxygen compounds without substantial cracking of hydrocarbons, which comprises subjecting said feedstock to selective hydrogenation at a temperature between about 350–650° F. in contact with hydrogen and a catalyst, and at a pressure between about 100 and 5000 p.s.i.g., said catalyst consisting of discrete particles of an adsorbent carrier containing distended thereon a minor proportion of a hydrogenating component selected from the class consisting of the oxides and sulfides of the metals of groups VIB and VIII of the periodic system, and a minor proportion of a radioactive component, said radioactive component being characterized by the emission of ionizing radiations which are substantially entirely beta rays of maximum energy between about 0.02 and 2.3 mev., the proportion of said radioactive component being adjusted so as to provide between about 500 and 50,000 curies of radioactivity per cubic foot of catalyst bed, and recovering from said contacting a purified hydrocarbon product.

2. A process as defined in claim 1 wherein said catalyst pellets are within the size range of about ⅛ inch to 1 inch in average diameter.

3. A process as defined in claim 1 wherein said hydrogenating component is selected from the class consisting of the oxides and sulfides of cobalt in admixture with a compound from the class consisting of the oxides and sulfides of molybdenum.

4. A process as defined in claim 3 wherein said carrier is essentially activated alumina.

5. A process for hydrorefining a mineral oil hydrocarbon feedstock containing an indigenous organic impurity from the class consisting of sulfur compounds, nitrogen compounds, and oxygen compounds without substantial cracking of hydrocarbons, which comprises subjecting said feedstock to selective hydrogenation at a temperature between about 0° and 850° F. in contact with hydrogen and a catalyst, and at a pressure between about 100 and 5,000 p.s.i.g., said catalyst consisting of discrete particles of an adsorbent carrier containing distended therein a hydrogenating component selected from the class consisting of the oxides and sulfides of the metals of groups VIB and VIII of the periodic system, and a radioactive component, said radioactive component being characterized by the emission of ionizing radiations including a proportion of beta radiation of maximum energy between about 0.01 and 3.9 mev. which is at least about 20% of the total radiation energy, any remaining radiation being substantially exclusively gamma radiation, and recovering from said contacting a purified hydrocarbon product.

6. A process as defined in claim 5 wherein said radioactive component is added in the amount of between about 500 and 50,000 curies of radioactivity per cubic foot of catalyst bed.

7. A process as defined in claim 5 wherein said radioactive component displays beta radiation of maximum energy within the range of about 0.02 to 2.3 mev.

8. A process as defined in claim 7 wherein said catalyst particles are within the size range of about 1/8 inch to 1 inch in average diameter.

9. A process as defined in claim 8 wherein said radioactive component is substantially entirely a beta emitter.

10. A catalyst effective for the hydrorefining of hydrocarbon feedstocks, said catalyst consisting essentially of a granular adsorbent oxide carrier containing homogeneously distributed therein a hydrogenating component selected from the class consisting of the oxides and sulfides of the metals of groups VIB and VIII of the periodic system, and a proportion of a radioactive component sufficient to induce in the finished catalyst at least about 500 curies per cubic foot of radioactivity, said radioactive component being characterized by the emission of ionizing radiations including a proportion of beta radiation of maximum energy between about 0.01 and 3.9 mev. which is at least about 20% of the total radiation energy, any remaining radiation being substantially exclusively gamma radiation.

11. A catalyst as defined in claim 10 wherein said catalyst granules are in the form of pellets of average diameter between about 1/8 inch and 1 inch.

12. A catalyst as defined in claim 10 wherein said hydrogenating component is selected from the class consisting of the oxides and sulfides of cobalt in admixture with a compound selected from the class consisting of the oxides and sulfides of molybdenum.

13. A catalyst as defined in claim 10 wherein said radioactive component is substantially entirely a beta emitter, and wherein the radiation from said radioactive component displays a maximum energy within the range of about 0.02 and 2.3 mev.

References Cited in the file of this patent
UNITED STATES PATENTS

| | | |
|---|---|---|
| 1,627,938 | Tingley | May 10, 1927 |
| 1,961,493 | Hillis | June 5, 1934 |
| 2,350,330 | Remy | June 6, 1944 |
| 2,687,381 | Hendricks | Aug. 24, 1954 |
| 2,743,223 | McClinton et al. | Apr. 24, 1956 |
| 2,845,388 | Black et al. | July 29, 1958 |
| 2,905,606 | Long et al. | Sept. 22, 1959 |

FOREIGN PATENTS

| | | |
|---|---|---|
| 1,148,720 | France | June 24, 1957 |